(12) United States Patent
Bi

(10) Patent No.: US 7,050,773 B2
(45) Date of Patent: May 23, 2006

(54) WIRELESS BROADCAST SERVICE QUALITY INDICATOR AND METHOD

(75) Inventor: Hao Bi, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 101 days.

(21) Appl. No.: 10/683,760

(22) Filed: Oct. 10, 2003

(65) Prior Publication Data

US 2005/0079821 A1 Apr. 14, 2005

(51) Int. Cl.
*H04B 17/00* (2006.01)

(52) U.S. Cl. ............... 455/226.1; 455/226.2; 455/226.3; 455/226.4; 455/67.13

(58) Field of Classification Search ............. 455/226.1, 455/226.2, 226.3, 226.4, 67.13
See application file for complete search history.

(56) References Cited

U.S. PATENT DOCUMENTS 5,461,611 A * 10/1995 Drake et al. ................ 370/420
2003/0156540 A1   8/2003 Trossen et al.
2003/0157899 A1   8/2003 Trossen et al.
2004/0047323 A1 * 3/2004 Park et al. ................... 370/338
2004/0142699 A1 * 7/2004 Jollota et al. ............. 455/452.2
2004/0259555 A1 * 12/2004 Rappaport et al. .......... 455/446

* cited by examiner

*Primary Examiner*—Doris H. To
*Assistant Examiner*—Sanh Phu
(74) *Attorney, Agent, or Firm*—Sylvia Chen

(57) ABSTRACT

A method for estimating wireless broadcast service quality on a broadcast channel including the steps of: receiving (310) a service parameter message with a service identifier associated with a broadcast channel, determining (320) a quality indicator threshold from the service parameter message, measuring (340) a quality indicator to form a calculated (350) quality indicator, comparing (360, 370) the calculated quality indicator to the quality indicator threshold. The quality indicator threshold can be embedded in the service parameter message or obtained indirectly such as through a table mapping a service identifier to a quality indicator. Various quality indicators are available, including various signal-to-noise ratios (e.g., $E_b/N_t$) and pilot signal-to-noise ratio ($C/I_{PICH}$).

13 Claims, 4 Drawing Sheets

WIRELESS BROADCAST SERVICE QUALITY INDICATOR AND METHOD

FIELD OF THE DISCLOSURE

This disclosure relates generally to wireless communications systems, and more particularly to broadcast services in a wireless communications system.

BACKGROUND OF THE DISCLOSURE

There are proposals to provide broadcast communications services on certain channels of various wireless communications networks, such as cdma2000 and WCDMA. These broadcast communications services are intended to provide a variety of information content in a variety of formats. For example, news, weather, stock information, and sports information could be provided using a video broadcast format, a picture format, and a text ticker format. Other information content includes music, music video, and entertainment. Each general type of information content could be provided using any number and combination of formats.

Generally, broadcast communications are unidirectional from a wireless base station to one or more wireless terminals. For example, a video broadcast may require a transmission rate of several ten-thousand bits per second (bps) in the forward direction from the base station to the mobile station while requiring only several thousand bps in the reverse direction to support signaling. Because of the pronounced asymmetry of transmission, the quality of the received signal at the wireless terminal is an important parameter in supporting broadcast services.

Usually, the broadcast communication services are transmitted on a channel at a fixed power. With dynamic radio conditions that are typical with wireless communications, users do not want to receive a broadcast service only to find that the quality of the reception is unsatisfactory. Frequent occurrences of poor reception quality, especially when a user is paying by the minute, will degrade the user experience. Thus, there is a desire to obtain broadcast services in a wireless communication system at an expected quality level.

The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

A method for estimating wireless broadcast service quality on a broadcast channel including the steps of: receiving a service parameter message with a service identifier associated with a broadcast channel, determining a quality indicator threshold from the service parameter message, measuring a quality indicator to form a calculated quality indicator, comparing the calculated quality indicator to the quality indicator threshold. The quality indicator threshold can be embedded in the service parameter message or obtained indirectly such as through a table mapping a service identifier to a quality indicator. Various quality indicators are available, including various signal-to-noise ratios (e.g., $E_b/N_t$) and pilot signal-to-noise ratio ($C/I_{PICH}$).

The results of the comparison can be presented to a user interface to assist a user in deciding if and when to register for a particular broadcast service. The wireless broadcast service quality indicator and method applies to other generally unidirectional wireless communications, including wireless multicast services. Thus, throughout this specification, the term "broadcast" includes multicast.

Figures 1, 2:
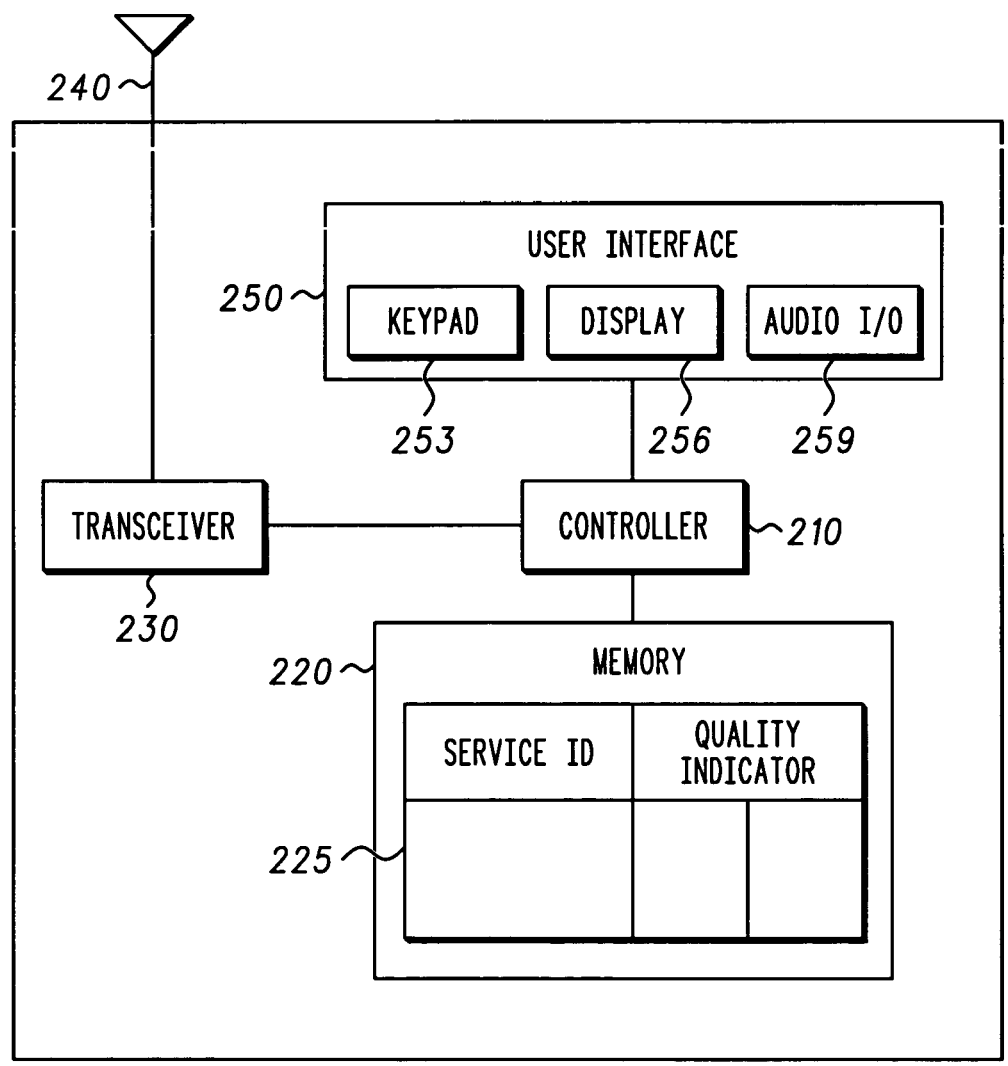
FIG. 1 shows a service parameter message according to a first preferred embodiment and a second preferred embodiment.
FIG. 2 shows a wireless terminal according to a third preferred embodiment and a fourth preferred embodiment.

FIG. 1 shows a service parameter message 100 according to a first preferred embodiment and a second preferred embodiment. The message 100 can be broadcasted on a forward channel (from a base station to a mobile station) in a wireless communications system. For example, if the wireless communications system is a cdma2000 system, the message can be broadcast on a forward paging channel (F-PCH), or forward broadcast control channel (F-BCCH). Other wireless communications systems, such as WCDMA, would use similar channels to transmit a service parameter message.

A service parameter message 100 contains information regarding an associated forward broadcast channel, which carries broadcast content. According to the preferred embodiment, the service parameter message 100 includes a data field 110 that includes a service identifier (service ID), which identifies a label for the broadcast content and a broadcast format, such as high quality video, low quality video, high quality picture, low quality picture, text, high quality audio, low quality audio, or a combination thereof. A second field 120 in the message 100 indicates a Walsh code of the associated forward broadcast channel, and a third field 130 indicates a coding scheme of the forward broadcast channel. Additional information field 140 indicates a data rate of the associated forward broadcast channel.

Field 150 contains quality indicator information, which indicates at least one value for a measure of quality. In the first preferred embodiment, field 150 contains a signal-to-noise ratio (SNR) threshold and a data-to-pilot ratio (D2P) for the associated forward broadcast channel. The SNR threshold corresponds to a minimum acceptable value for $E_b/N_t$, which is a ratio of energy per bit to noise spectrum density, on the associated forward broadcast channel. Alternate types of SNR measures, such as packet error rate, symbol error rate, bit error rate, or frame erasure rate are acceptable substitutes for an $E_b/N_t$ value. Additionally, different types of thresholds, such as a scaled threshold or target threshold, are acceptable substitutes for a minimum threshold. The D2P represents the ratio of the transmission power of data to the power of pilot.

In a second embodiment, quality indicator field 150 contains a target received pilot channel signal-to-noise ratio (target $C/I_{PICH}$) value. Note that a target $C/I_{PICH}$ is easily determined by taking a target SNR and dividing it by the spreading factor S and the data-to-pilot ratio D2P. Alternate forms of a target $C/I_{PICH}$ value are acceptable, such as a scaled version or a minimum threshold.

Finally, the message 100 includes other fields 160 that contain additional information regarding the associated forward broadcast channel, such as the service modulation scheme, the frame size on the associated forward broadcast channel, and the associated forward broadcast channel's channel structure.

A message 100 can be implemented as a Broadcast Service Parameter Message (BSPM) transmitted on a forward paging channel (F-PCH) or a forward broadcast control channel (F-BCCH) in a cdma2000 system. Alternately, contents of a service parameter message can be segmented into portions and transmitted separately, which allows the different portions to be transmitted at different rates. Other wireless communications channels can transmit the service parameter message 100, or portions thereof, in different message structures on appropriate channels.

In a third preferred embodiment and a fourth preferred embodiment, a service parameter message includes a service ID field 110 but does not include a quality indicator field 150. Instead, the network sends a quality indicator table to a mobile station. In the third preferred embodiment, a quality table maps a service ID with an SNR threshold and a D2P. In the fourth preferred embodiment, a quality table maps a service ID with a target $C/I_{PICH}$. Thus, when a mobile station receives a transmitted service ID from a service parameter message, it can determine related quality indicators from the table.

FIG. 2 shows a wireless terminal 200 according to a third preferred embodiment and a fourth preferred embodiment. This figure shows a quality indicator table 225 stored in a memory 220 of the wireless terminal 200. As described earlier, a quality indicator table 225 maps a service ID to one or more quality indicators. The wireless terminal 200 includes an antenna 240 coupled to a transceiver 230 for wireless communications. The transceiver 230 is coupled to a controller 210, which is in turn coupled to a memory 220 and a user interface module 250 having a keypad 253, a display 256, and an audio input/output module 259.

Figure 3:
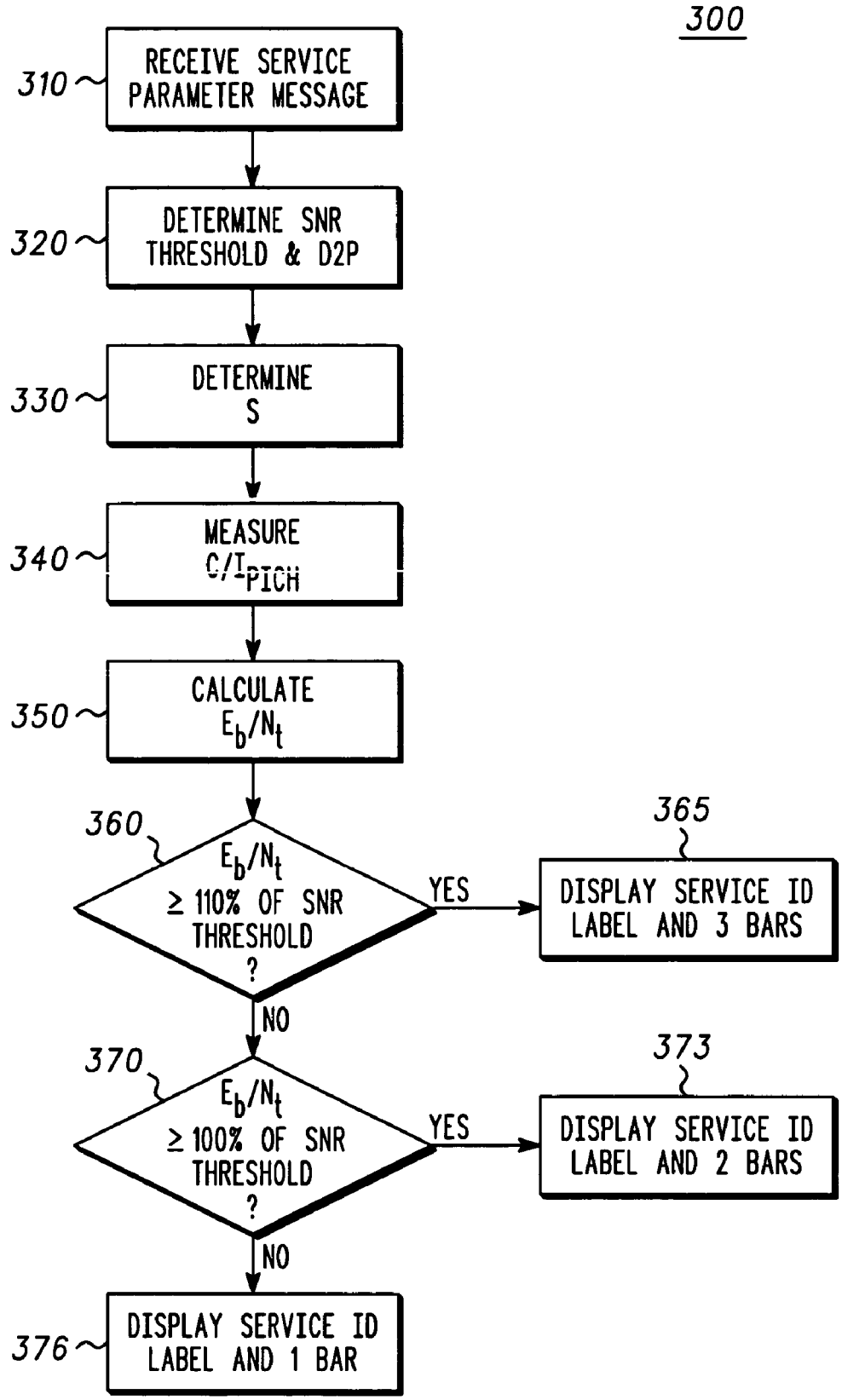
FIG. 3 shows a flow diagram for processing quality indicator information according to the first preferred embodiment and the third preferred embodiment.

FIG. 3 shows a flow diagram 300 for processing quality indicator information according to the first preferred embodiment and the third preferred embodiment. Preferably, the flow diagram is implemented in software in a mobile station. In the first preferred embodiment, SNR threshold and D2P information is included in a service parameter message such as the one shown in FIG. 1. In the third preferred embodiment, a service ID is included in a service parameter message, but related SNR threshold and D2P information is obtained from a table stored in a memory of a mobile terminal such as the one shown in FIG. 2.

In an initial pass through the flow diagram 300, a mobile station receives a service parameter message in step 310. If the service parameter message contains a quality indicator field, the mobile station extracts the SNR threshold and D2P. If the service parameter message contains a service ID and the mobile station has a quality table stored in its memory, the mobile station obtains the SNR threshold and D2P from the quality table. Thus, step 320 determines the SNR threshold and D2P associated with a service ID.

Step 330 determines a spreading factor S of the associated forward broadcast channel, and step 340 measures the received pilot signal-to-noise ratio $C/I_{PICH}$ at the mobile station. With D2P, S, and $C/I_{PICH}$, step 350 calculates $E_b/N_t$ to estimate the quality of reception for the associated forward broadcast channel:

$$E_b/N_t = C/I_{PICH} * D2P * S$$

If step 360 determines that $E_b/N_t$ is greater than or equal to 110% of the SNR threshold, the user interface module displays the service ID label and three bars in step 365. If $E_b/N_t$ is greater than or equal to 100% (but less than 110%) of the SNR threshold, as determined by step 370, the user interface module displays the service ID label and two bars in step 373. Otherwise, the user interface module displays the service ID label and one bar in step 376.

Of course, different percentages of the SNR threshold can result in different displays depending on implementation or user preferences. The flow is repeated for each received service ID to result in a quality display for each broadcast service available to a mobile station at a particular time and location. Since a calculated $E_b/N_t$ changes with user mobility, a quality display is updated accordingly. For a particular service ID, the flow can be rerun starting from step 340 if a new service parameter message has not been received in the interval between quality display updates.

Figure 4:
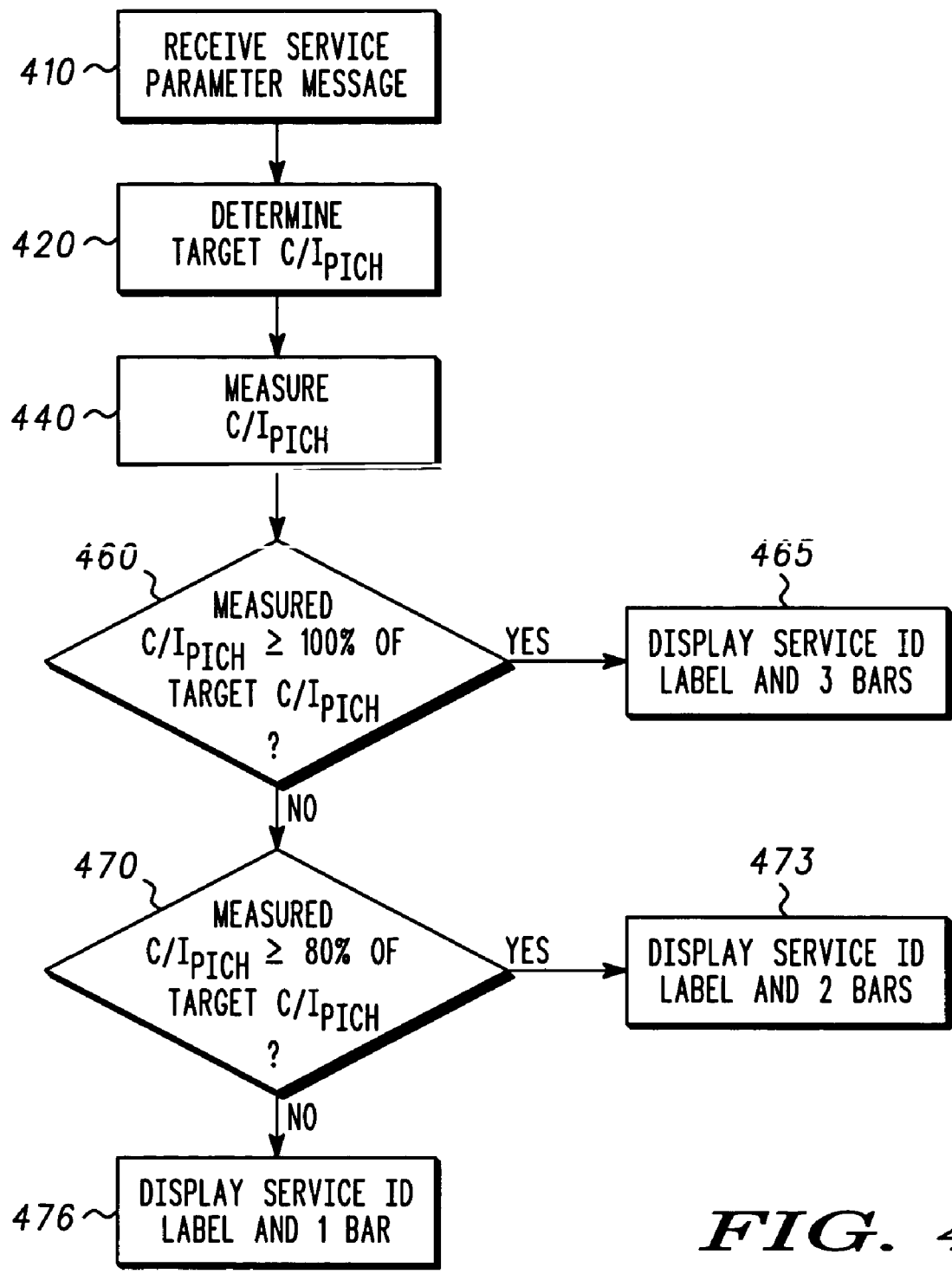
FIG. 4 shows a flow diagram for processing quality indicator information according to the second preferred embodiment and the fourth preferred embodiment.

FIG. 4 shows a flow diagram 400 for processing quality indicator information according to the second preferred embodiment and the fourth preferred embodiment. Preferably, the flow diagram is implemented in software in a mobile station. In the second preferred embodiment, target $C/I_{PICH}$ information is included in a service parameter message such as the one shown in FIG. 1. In the fourth preferred embodiment, a service ID is included in a service parameter message, but related target $C/I_{PICH}$ information is obtained from a table stored in a memory of a mobile terminal such as the one shown in FIG. 2.

In an initial pass through the flow diagram 400, a mobile station receives a service parameter message in step 410. If the service parameter message contains a quality indicator field, the mobile station extracts the target $C/I_{PICH}$. If the service parameter message contains a service ID and the mobile station has a quality table stored in its memory, the mobile station obtains the target $C/I_{PICH}$ from the quality table. Thus, step 420 determines the target $C/I_{PICH}$ associated with a service ID.

Step 440 measures the received pilot signal-to-noise ratio $C/I_{PICH}$ at the mobile station. If step 460 determines that the received $C/I_{PICH}$ is greater than or equal to 100% of the target $C/I_{PICH}$, the user interface module displays the service ID label and three bars in step 465. If the received $C/I_{PICH}$ is greater than or equal to 80% (but less than 100%) of the target $C/I_{PICH}$, as determined by step 470, the user interface module displays the service ID label and two bars in step 473. Otherwise, the user interface module displays the service ID label and one bar in step 476.

Of course, different percentages of the target $C/I_{PICH}$ can result in different displays depending on implementation or user preferences. The flow is repeated for each received service ID to result in a quality display for each broadcast service available to a mobile station at a particular time and location. Since a measured $C/I_{PICH}$ changes with user mobility, a quality display is updated accordingly. For a particular service ID, the flow can be rerun starting from step 440 if a new service parameter message has not been received in the interval between quality display updates.

Figure 5:
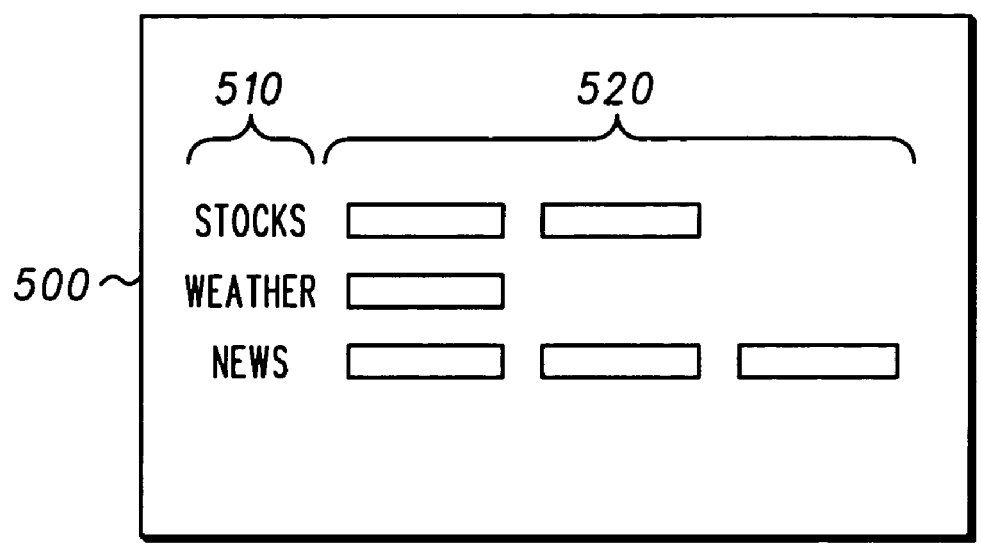
FIG. 5 shows an example user interface display according to the preferred embodiments.

FIG. 5 shows an example user interface display 500 according to the preferred embodiments. Once a measure of quality, such as $E_b/N_t$ or $C/I_{PICH}$, has been measured and compared for a particular service ID, the result is displayed on a mobile station for a user. A label 510, such as "stocks," is associated with a first service ID and displayed on a user interface. A quality display 520, such as two bars, associated with the first service ID is displayed on the user interface adjacent to the label 510. Other user interface configurations also achieve the desired effect of indicating the quality of the broadcast service. For example, different visual display configurations, audio information, or a combination thereof, could be used to indicate the quality of a broadcast service.

Figure 6:
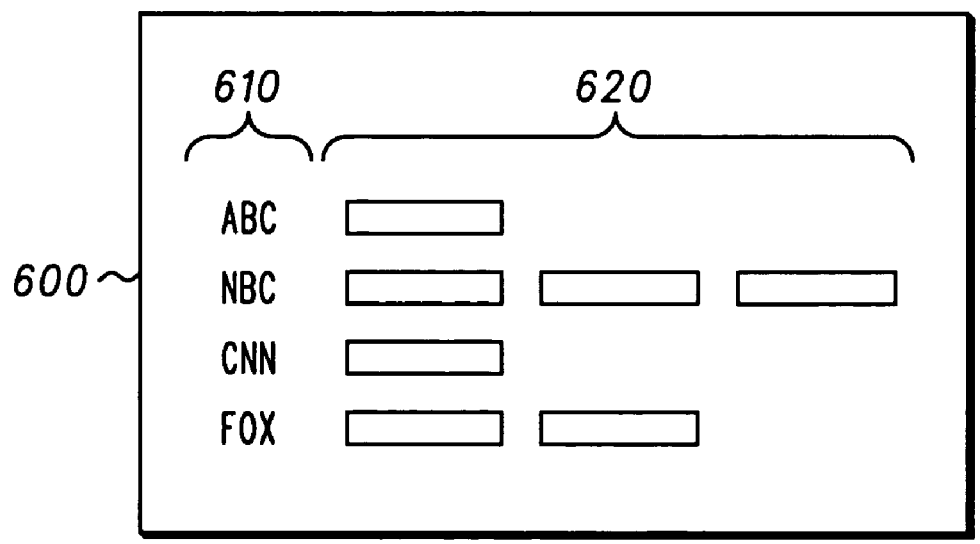
FIG. 6 shows another example user interface display according to the preferred embodiments.

FIG. 6 shows another example user interface display 600 according to the preferred embodiments. Once a quality display has been measured and compared for a particular service ID, the result is displayed on a mobile station for a user. A label 610, such as "ABC," is associated with a first service ID and displayed on a user interface. A quality display 620, such as one bar, associated with the first service ID is displayed on the user interface adjacent to the label 610. Other user interface configurations also achieve the desired effect of indicating the quality of the broadcast service. For example, different visual display configurations, audio information, or a combination thereof, could be used to indicate the quality of a broadcast service.

With quality information such as that shown in FIG. 5 or FIG. 6, a user can decide if and when to register to receive a particular broadcast service. For example, if a user is interested in weather information but sees only one bar on the display as shown in FIG. 5, the user can move to a different location that results in two or three bars for the weather broadcast service before registering. As another example, a user may be interested in the news but not be concerned which broadcast service is providing the news just as long as the quality is good. Then, a user would select "NBC" from the news channels shown in FIG. 6. Or, if a user is particularly interested in "ABC," the user would realize before registering that the quality of the broadcast service may be degraded. This would alleviate the frustration of a user registering for (and paying for) broadcast services of lower quality than expected.

Thus, the wireless broadcast service quality indicator and method provide useful information to a user to assist in selecting a broadcast service of adequate quality under dynamic radio conditions.

While this disclosure includes what are considered presently to be the preferred embodiments and best modes of the invention described in a manner that establishes possession thereof by the inventors and that enable those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

The invention claimed is:

1. A method for estimating wireless broadcast service quality on a broadcast channel comprising the steps of:

receiving a service parameter message with a broadcast content service identifier associated with a broadcast channel;

determining a quality indicator threshold and a data to pilot ratio (D2P) from the service parameter message determining a spreading factor S of the broadcast channel;

measuring a pilot signal-to-noise ratio ($C/I_{PICH}$) of an associated signal to form a calculated quality indicator "$E_b/N_t$" by multiplying $C/I_{PICH}$ by a spreading factor S and the D2P; and comparing the calculated quality indicator to the quality indicator threshold.

2. A method according to claim 1 wherein the step of determining a quality indicator threshold and a D2P comprises:

extracting the quality indicator threshold from the service parameter message.

3. A method according to claim 2 wherein the step of extracting comprises:

obtaining a signal-to-noise ratio (SNR) threshold and the data to pilot ratio (D2P).

4. A method according to claim 1 wherein the step of comparing comprises:

determining if the $E_b/N_t$ is less than the quality indicator threshold.

5. A method according to claim 2 wherein the step of extracting comprises:

obtaining a pilot signal-to-noise ratio ($C/I_{PICH}$) threshold.

6. A method according to claim 5, wherein the step of measuring comprises:

measuring the pilot signal-to-noise ratio ($C/I_{PICH}$) of the associated channel to form a calculated quality indicator "measured $C/I_{PICH}$."

7. A method according to claim 6 wherein the step of comparing comprises:

determining if the measured $C/I_{PICH}$ is greater than the $C/I_{PICH}$ threshold.

8. A method according to claim 1 wherein the step of determining a quality indicator threshold and a data to pilot ratio (D2P) comprises:

obtaining the quality indicator threshold, associated with the service identifier, from a table in a memory.

9. A method according to claim 8 wherein the quality indicator threshold is a signal-to-noise ratio (SNR) threshold and the data to pilot ratio (D2P).

10. A method according to claim 8 wherein the quality indicator threshold is the pilot signal-to-noise ratio ($C/I_{PICH}$) threshold.

11. A method according to claim 1 further comprising the step of:

presenting a result of the step of comparing in a user interface.

12. A method according to claim 11 wherein the step of presenting comprises:

displaying a label associated with the service identifier; and displaying an indicator indicating whether the calculated quality indicator is less than the quality indicator threshold.

13. A method according to claim 11 further comprising the step of:

displaying an indicator indicating whether the calculated quality indicator is greater than the quality indicator threshold.

* * * * *